United States Patent
Joshi et al.

(10) Patent No.: US 8,395,496 B2
(45) Date of Patent: Mar. 12, 2013

(54) MINIATURE MODULAR WIRELESS SENSOR

(76) Inventors: Shiv P Joshi, Rancho Palos Verdes, CA (US); Cesar Del Solar, Pasadena, CA (US)

(*) Notice: Subject to any disclaimer, the term of this patent is extended or adjusted under 35 U.S.C. 154(b) by 604 days.

(21) Appl. No.: 12/079,752

(22) Filed: Mar. 27, 2008

(65) Prior Publication Data
US 2009/0058663 A1 Mar. 5, 2009

Related U.S. Application Data

(60) Provisional application No. 60/920,859, filed on Mar. 29, 2007.

(51) Int. Cl.
*G08B 1/08* (2006.01)
*H04M 11/04* (2006.01)
(52) U.S. Cl. .......... 340/539.1; 340/539.22; 340/539.26; 340/539.11; 340/539.13; 455/404.1
(58) Field of Classification Search ............... 340/539.1, 340/539.22, 539.26
See application file for complete search history.

(56) References Cited

U.S. PATENT DOCUMENTS

| | | | | |
|---|---|---|---|---|
| 6,889,165 | B2* | 5/2005 | Lind et al. ................. | 702/183 |
| 7,034,677 | B2* | 4/2006 | Steinthal et al. ......... | 340/539.12 |
| 7,429,936 | B2* | 9/2008 | Paradiso et al. .......... | 340/988 |
| 2007/0123282 | A1* | 5/2007 | Levinson .................. | 455/500 |

* cited by examiner

*Primary Examiner* — Donnie Crosland
(74) *Attorney, Agent, or Firm* — John R. Ross; John R. Ross, III (57) ABSTRACT

A miniature modular wireless sensor unit. The unit includes three separate easily assembled and disassembled modules: a processor-communications module, a battery pack module, and a swappable sensor module. Preferred embodiments utilize Bluetooth radio communication technology to communicate sensor data. The total size of preferred embodiments is 1.380 inch×0.940 inch×0.540 inch. Preferred embodiments are easily programmed and calibrated by lay people to automatically communicate sensor information via Bluetooth techniques to a personal computer, laptop or similar equipment. A wide variety of sensors can be utilized with the standard sensor unit. Various battery pack modules are provided to match battery power with needs.

20 Claims, 7 Drawing Sheets

MINIATURE MODULAR WIRELESS SENSOR

CROSS REFERENCE TO RELATED APPLICATIONS

This application claims the benefit of U.S. Provisional Application Ser. No. 60/920,859 filed Mar. 29, 2007.

FEDERALLY SUPPORTED RESEARCH

This invention was made in the course of performance of contract number FA8650-05-C-2527 with the United States Air Force Research Laboratories and the United States Governments has rights in the invention.

FIELD OF THE INVENTION

The present invention relates to sensors and in particular to wireless sensors.

BACKGROUND OF THE INVENTION

Sensors

A sensor is a device which measures a physical quantity and converts it into a signal which can be read by an observer or by an instrument. For example, a mercury thermometer converts the measured temperature into expansion and contraction of a liquid which can be read on a calibrated glass tube. A thermocouple converts temperature to an output voltage which can be read by a voltmeter. For accuracy, all sensors need to be calibrated against known standards.

Sensors are used in everyday objects such as mobile phones, laptops, personal computers, printers, GPS receivers, digital cameras, and video game consoles, touch-sensitive elevator buttons and lamps which dim or brighten by touching the base. Applications include automobiles, machines, aerospace, medicine, industry, and robotics.

Technological progress allows more and more sensors to be manufactured on a microscopic scale as microsensors using MEMS technology. In most cases, a microsensor reaches a significantly higher speed and sensitivity compared with macroscopic approaches.

Types of Sensors

Thermal Sensors

Thermal sensors include thermometers, thermocouples, temperature sensitive resistors, bi-metal thermometers and thermostates all for sensing temperature and heat sensors including bolometers, calorimeters, and heat flux sensors for measuring heat or heat flow.

Optical Sensors

Optical sensors include photodetectors (such as photocells, photodiodes, phototransistors, and CCDs which may or may not be configured as image sensors), vacuum tube devices, photomultiplier devices, LIDAR devices, infrared sensors, proximity sensors combining a photocell and a LED or a laser.

Electromagnetic Sensors (Other Than Optical)

Electromagnetic sensors include electrical resistance sensors (such as ohmmeters and multimeters), electrical current sensors (such as galvanometers and ammeters), electrical voltage sensors (such as leaf electroscopes and voltmeters), electrical power sensors (such as watt-hour meters), magnetism sensors (such as magnetic compasses, fluxgate compasses, magnetometers, Hall effect devices, metal detectors and radar systems).

Mechanical Sensors

Mechanical sensors include various types of pressure sensors, gas and liquid flow sensors, accelerometers and position sensors.

Chemical Sensors

Chemical sensors include many types of chemical detectors such as oxygen sensors and carbon monoxide detectors.

Acoustic Sensors

Acoustic sensors include sound sensors (such as microphones and hydrophones) and seismometers.

Ionising Radiation Sensors

Ionising radiation sensors include Geiger counters, dosimeters, Scintillation counters, and neutron detection sensors.

Motion Sensors

Motion sensors include radar guns, speedometers, tachometers, odometers, occupancy sensors, gyroscopes, artificial horizon sensors and ring laser gyroscopes.

Bluetooth

Bluetooth is an industrial specification for wireless personal area networks. Bluetooth provides a way to connect and exchange information between devices such as mobile phones, laptops, personal computers, printers, GPS receivers, digital cameras, and video game consoles over a secure, globally unlicensed short-range radio frequency.

Bluetooth is a standard and communications protocol primarily designed for low power consumption, with a short range (power-class-dependent) using low-cost transceiver microchips. Class 1 operates at power levels up to 100 mW at ranges up to about 100 meters, Class 2 operates at power levels up to 2.5 mW at ranges up to about 10 meters and Class 3 devices operates at power levels up to 1.0 mW at ranges up to about 1 meter.

Bluetooth enables these devices to communicate with each other when they are in range. The devices use a radio communications system, so they do not have to be in line of sight of each other, and can even be in other rooms, as long as the received transmission is powerful enough. In order to use Bluetooth, a device must be compatible with certain Bluetooth profiles. These define the possible applications and uses of the technology.

Bluetooth Applications

More prevalent applications of Bluetooth include:

Wireless control of and communication between a mobile phone and a hands-free headset. This was one of the earliest applications to become popular.

Wireless networking between PCs in a confined space and where little bandwidth is required.

Wireless communications with PC input and output devices, the most common being the mouse, keyboard and printer.

Transfer of files between devices.

Transfer of contact details, calendar appointments, and reminders between devices.

Replacement of traditional wired serial communications in test equipment, GPS receivers, medical equipment, bar code scanners, and traffic control devices.

For controls where infrared was traditionally used.

Sending small advertisements from Bluetooth enabled advertising hoardings to other, discoverable, Bluetooth devices.

Two seventh-generation game consoles, Nintendo's Wii and Sony's PlayStation 3 use Bluetooth for their respective wireless controllers.

Dial-up internet access on personal computer or personnel digital assistant (PDA) using a data-capable mobile phone as a modem.

Bluetooth exists in many products, such as phones, printers, modems and headsets. The technology is useful when transferring information between two or more devices that are near each other in low-bandwidth situations. Bluetooth is commonly used to transfer sound data with phones (i.e. with a Bluetooth headset) or byte data with hand-held computers (transferring files).

Bluetooth simplifies the discovery and setup of services between devices. Bluetooth devices advertise all of the services they provide. This makes using services easier because there is no longer a need to set up network addresses or permissions as in many other networks. A personal computer must have a Bluetooth adapter in order to be able to communicate with other Bluetooth devices (such as mobile phones, mice and keyboards). While some desktop computers and most recent laptops come with a built-in Bluetooth adapter, others will require an external one in the form of a dongle.

Communication and Connection

A master Bluetooth device can communicate with up to seven devices. Up to 255 further devices can be inactive, or parked, which the master device can bring into active status at any time. At any given time, data can be transferred between the master and one other device, however, the devices can switch roles and the slave can become the master at any time. The master switches rapidly from one device to another in a round-robin fashion.

Setting up Connections

Any Bluetooth device will transmit the following information on demand:
Device name.
Device class.
List of services.
Technical information, for example, device features, manufacturer, Bluetooth specification used, clock offset.

Any device may perform an inquiry to find other devices to connect to, and any device can be configured to respond to such inquiries. However, if the device trying to connect knows the address of the device, it always responds to direct connection requests and transmits the information shown in the list above if requested. Use of device services may require pairing or acceptance by its owner, but the connection itself can be initiated by any device and held until it goes out of range.

Every device has a unique 48-bit address. However these addresses are generally not shown in inquiries. Instead, friendly Bluetooth names are used, which can be set by the user. This name appears when another user scans for devices and in lists of paired devices. Most phones have the Bluetooth name set to the manufacturer and model of the phone by default. Most phones and laptops show only the Bluetooth names and special programs that are required to get additional information about remote devices.

Air Interface

As indicated above, the Bluetooth protocol operates in the license-free ISM band at 2.4-2.4835 GHz. To avoid interfering with other protocols that use the 2.45 GHz band, the Bluetooth protocol divides the band into 79 channels (each 1 MHz wide) and changes channels up to 1600 times per second. Implementations with versions 1.1 and 1.2 reach speeds of 723.1 Kbit/s. Version 2.0 implementations feature Bluetooth Enhanced Data Rate and reach 2.1 Mbit/s. Technically, version 2.0 devices have a higher power consumption, but the three times faster rate reduces the transmission times, effectively reducing power consumption to half that of 1.x devices (assuming equal traffic load).

Wi-Fi

Wi-Fi is a wireless-technology similar to Bluetooth. Common applications for Wi-Fi include Internet and voice over Internet phone access, gaming, and network connectivity for consumer electronics such as televisions, DVD players, and digital cameras. Wi-Fi technologies have gone through several generations since their inception in 1998. The Microsoft Windows, Apple Mac OS X and open source Unix and Linux operating systems support Wi-Fi to different extents.

A Wi-Fi enabled device such as a PC, game console, cell phone, MP3 player or PDA can connect to the Internet when within range of a wireless network connected to the Internet. The coverage of one or more interconnected access points, called a "hotspot", can comprise an area as small as a single room with wireless-opaque walls or as large as many square miles covered by overlapping access points.

In addition to restricted use in homes and offices, Wi-Fi can make access publicly available at Wi-Fi hotspots provided either free of charge or to subscribers to various providers. Organizations and businesses such as airports, hotels and restaurants often provide free hotspots to attract or assist clients. Wi-Fi also allows connectivity in peer-to-peer (wireless ad-hoc network) mode, which enables devices to connect directly with each other. This connectivity mode can prove useful in consumer electronics and gaming applications.

Bluetooth and Wi-Fi Advantages

Many consumer devices use Bluetooth and Wi-Fi. Amongst others, personal computers can network to each other and connect to the Internet, mobile computers can connect to the Internet from any Wi-Fi or Bluetooth hotspot, and digital cameras can transfer images wirelessly.

Routers which incorporate a DSL-modem or a cable-modem and an access point, often set up in homes and other premises, provide Internet-access and internetworking to all devices connected (wirelessly or by cable) to them. One can also connect devices in adhoc mode for client-to-client connections without a router.

As of 2007 these technologies had spread widely within business and industrial sites. In business environments, just like other environments, increasing the number of access-points provides redundancy, support for fast roaming and increased overall network-capacity by using more channels or by defining smaller cells. Over the years, implementations have moved toward "thin" access-points, with more of the network intelligence housed in a centralized network appliance, relegating individual access-points to the role of mere "dumb" radios. Outdoor applications may utilize true mesh topologies. As of 2007 installations can provide a secure computer networking gateway, firewall, DHCP server, intrusion detection system, and other functions.

Wi-Fi and Bluetooth allow LANs to be deployed without cabling for client devices, typically reducing the costs of network deployment and expansion. Spaces where cables cannot be run, such as outdoor areas and historical buildings, can host wireless LANs. As of 2007 wireless network adapters are built into most modern laptops. The price of chipsets continues to drop, making it an economical networking option included in even more devices. These technologies have become widespread in corporate infrastructures.

Different competitive brands of access points and client network interfaces are interoperable at a basic level of service. Unlike mobile telephones, any standard Bluetooth or Wi-Fi device will work anywhere in the world.

Bluetooth and Wi-Fi Disadvantages

Bluetooth and Wi-Fi networks have limited range. A typical Wi-Fi home router using 802.11b or 802.11g with a stock antenna might have a range of 32 m (120 ft) indoors and 95 m (300 ft) outdoors. Range also varies with frequency band. Wi-Fi in the 2.4 GHz frequency block has slightly better range than Wi-Fi in the 5 GHz frequency block. Outdoor range with improved (directional) antennas can be several kilometers or more with line-of-sight. Performance also decreases exponentially as the range increases.

Signal pollution, or an excessive number of access points in the area, especially on the same or neighboring channel, can prevent access and interfere with the use of other access points by others, caused by overlapping channels, as well as with decreased signal-to-noise ratio between access points. This can be a problem in high-density areas, such as large apartment complexes or office buildings with many access points. Additionally, other devices use the 2.4 GHz band: microwave ovens, security cameras and (in some countries) Amateur radio, video senders, cordless phones and baby monitors can cause significant additional interference.

Wi-Fi and Bluetooth Comparisons

Bluetooth and Wi-Fi have slightly different applications in today's offices, homes, and on the move: setting up networks, printing, or transferring presentations and files from PDAs to computers. Both are versions of unlicensed spread spectrum technology.

Bluetooth differs from Wi-Fi in that the latter provides higher throughput and covers greater distances, but requires more expensive hardware and higher power consumption. They use the same frequency range, but employ different modulation techniques. While Bluetooth is a replacement for a variety of applications, Wi-Fi is a replacement only for local area network access. Bluetooth is often thought of as wireless USB, whereas Wi-Fi is wireless Ethernet, both operating at much lower bandwidth than the cable systems they are trying to replace.

Other Personal Area Networks

There are other available low cost low power personal area networks similar to Bluetooth. One such network is Zigbee. ZigBee is the name of a specification for a suite of high level communication protocols using small, low-power digital radios based on the IEEE 802.15.4 standard for wireless personal area networks, such as wireless headphones connecting with cell phones via short-range radio. The technology is intended to be simpler and cheaper than networks such as Bluetooth. ZigBee is targeted at radio-frequency applications that require a low data rate, long battery life, and secure networking.

For non-commercial purposes, the ZigBee specification is available free to the general public. An entry level membership in the ZigBee Alliance, called Adopter, costs $3500 annually and provides access to the as-yet unpublished specifications and permission to create products for market using the specifications.

ZigBee operates in the industrial, scientific and medical radio bands; 868 MHz in Europe, 915 MHz in countries such as USA and Australia, and 2.4 GHz in most jurisdictions worldwide. ZigBee chip vendors typically sell integrated radios and microcontrollers with between 60K and 128K flash memory, such as the Freescale MC13213, the Ember EM250 and the Texas Instruments CC2430. Radios are also available stand-alone to be used with any processor or microcontroller. Generally, the chip vendors also offer the ZigBee software stack, although independent ones are also available. As of 2006, the retail price of a Zigbee-compliant transceiver is approaching $1, and the price for one radio, processor, and memory package is about $3. Comparatively, the price of consumer-grade Bluetooth chips is now under $3.

Wireless Sensors

Wireless sensors are well known. The development of wireless sensor networks was originally motivated by military applications such as battlefield surveillance. However, wireless sensor networks are now used in many civilian application areas, including environment and habitat monitoring, healthcare applications, home automation, and traffic control. In addition to one or more sensors, each node in a sensor network is typically equipped with a radio transceiver or other wireless communications device, a small microcontroller, and an energy source, usually a battery. The cost of sensor nodes is similarly variable, ranging from hundreds of dollars to a few cents, depending on the size of the sensor network and the complexity required of individual sensor nodes. Size and cost constraints on sensor nodes result in corresponding constraints on resources such as energy, memory, computational speed and bandwidth. Wireless sensors tend to be designed on a case-by-case basis to solve particular needs and the wireless sensor unit is sold as a package. As a result there are hundreds of different wireless sensors available each with a specific application.

What is needed is a single inexpensive, compact, modular, programmable wireless sensor solution to customer needs in all fields of wireless sensing including military, security, medical, industrial, housing and automotive.

SUMMARY OF THE INVENTION

The present invention provides a miniature modular wireless sensor unit. The unit includes three separate easily assembled and disassembled modules: a processor-communications module, a battery pack module, and a swappable sensor module. Preferred embodiments utilize Bluetooth radio communication technology to communicate sensor data. The total size of preferred embodiments is 1.380 inch× 0.940 inch×0.540 inches. Preferred embodiments are easily programmed and calibrated by lay people to automatically communicate sensor information via Bluetooth techniques to a personal computer, laptop or similar equipment. A wide variety of sensors can be utilized with the standard sensor unit. Various battery pack modules are provided to match battery power with needs.

DETAILED DESCRIPTIONS OF PREFERRED EMBODIMENTS

First Preferred Embodiment

A first preferred embodiment of the present invention is a modular wireless sensor unit comprised of three separate modules the fit together to form a small 1.380 inch×0.940 inch×0.540 inch box-shaped sensor transmitter receiver providing electronic monitoring and communication to interested users anywhere in the world through the Internet. The three modules are, a battery pack module 1, a processor-communication module 2 and a sensor module 3. The sensor unit can be easily separated into its three parts for battery replacement or to change sensor units. Sensor modules can include any of a wide variety of sensors including all of those listed in the Background section of this specification. In a specific preferred embodiment the sensor is an extremely sensitive accelerometer that Applicants have built, tested and supplied to the United States Air Force. Other sensor modules currently in design or production include acoustic sensors, image sensors (frame-by-frame and real time video). Applicants' contemplated sensor list includes all of the sensors described in the Background section. The modular wireless sensor unit in preferred embodiments communicates with users anywhere in the world through a standard commercially available Bluetooth base station device.

In general, components needed for a large number of embodiments of the present invention are currently commercially available. For example the modular wireless sensor unit for the accelerometer embodiment utilizes the following off-the-shelf components available from the suppliers indicated:

Microprocessor Part No.: PIC18F2520, made by Microchip with offices in Chandler, Arizona. It is a small low-power microcontroller that can run at up to 10 million instructions per second. It has an 8-bit architecture, and contains a built in analog-to-digital converter.

Micro-radio Part No.: DFBM-CF220 Bluetooth module, made by Delta with offices in Taiwan. This is a Bluetooth class 2 radio module.

Amplifier Part No.: LMC6462 amplifier unit available from National Semiconductor with offices in Santa Clara, Calif. This part buffers the analog signal coming from the sensor. The output impedance of many analog sensors is too high for many ADCs found in commercial microcontrollers, so this amplifier effectively lowers the output impedance of the sensor it is connected to. For example, the output impedance of the accelerometer Applicants use is 32 kilo-ohms, whereas the input impedance of the ADC of the microcontroller is about 1.5 kilo-ohms. If the accelerometer were directly connected to the analog to digital converter, the low current coming out of the accelerometer would not charge the capacitors in the converter quickly enough, thus resulting in incorrect readings. An amplifier in between would effectively act as a perfect voltage source, allowing the converter to draw the higher current that it needs.

Battery Part NO.: 042025 available from TCL Hyperpower Batteries with offices in China. This is a 3.7 Volt 150 milliamp-hours lithium polymer battery.

Accelerometer Part No.: ADXL320 available from Analog Devices with offices in Norwood, Mass. This is a 2-axis accelerometer that can sense between −5 and +5 g with a bandwidth of about 2500 Hz.

Supporting electronics: capacitors, resistors, power button, battery connectors described in more detail by reference to FIGS. 1, 2 and 4-6. All of these electronics plus the above parts make up the three module modular wireless sensor unit.

The modular wireless sensor unit is designed to communicate through the Internet through a Bluetooth base station. A prototype base station was built by Applicants using twelve Bluetooth dongles. These dongles were Model No.: RN-USB-X dongles available from Roving Networks with offices in Los Gatos, Calif. The Base Station consists of a box with the twelve RN-USB-X Bluetooth dongles, connected to two hubs. The box connects to a computer via two USB cables, and requires no drivers for a Windows XP or Vista computer.

Processor-Communication Module Circuit Diagrams

Figure 1:
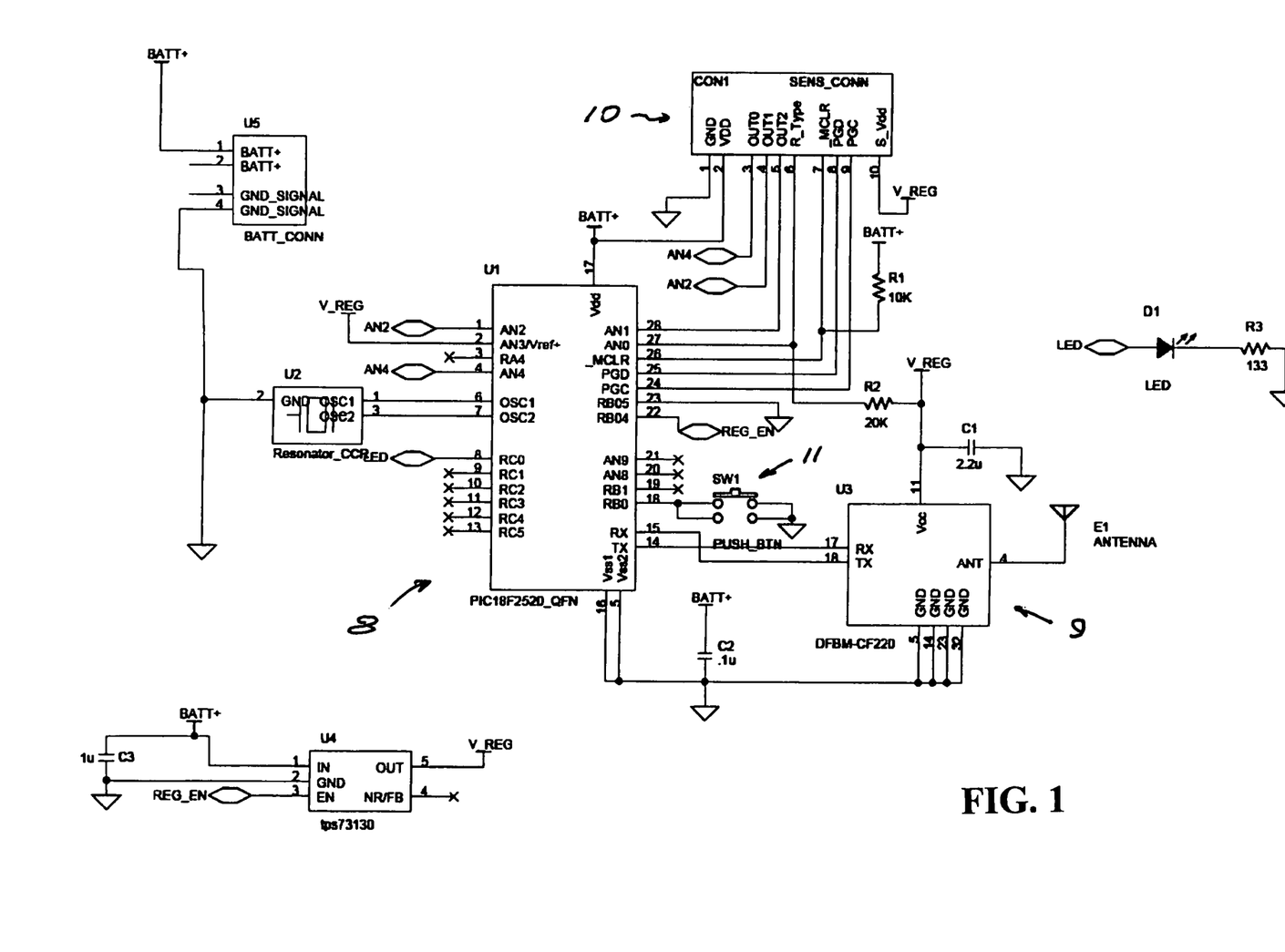
FIG. 1 is a circuit drawing showing the important electronic features of a sensor unit portion of a preferred embodiment of the present invention.
Figure 3:
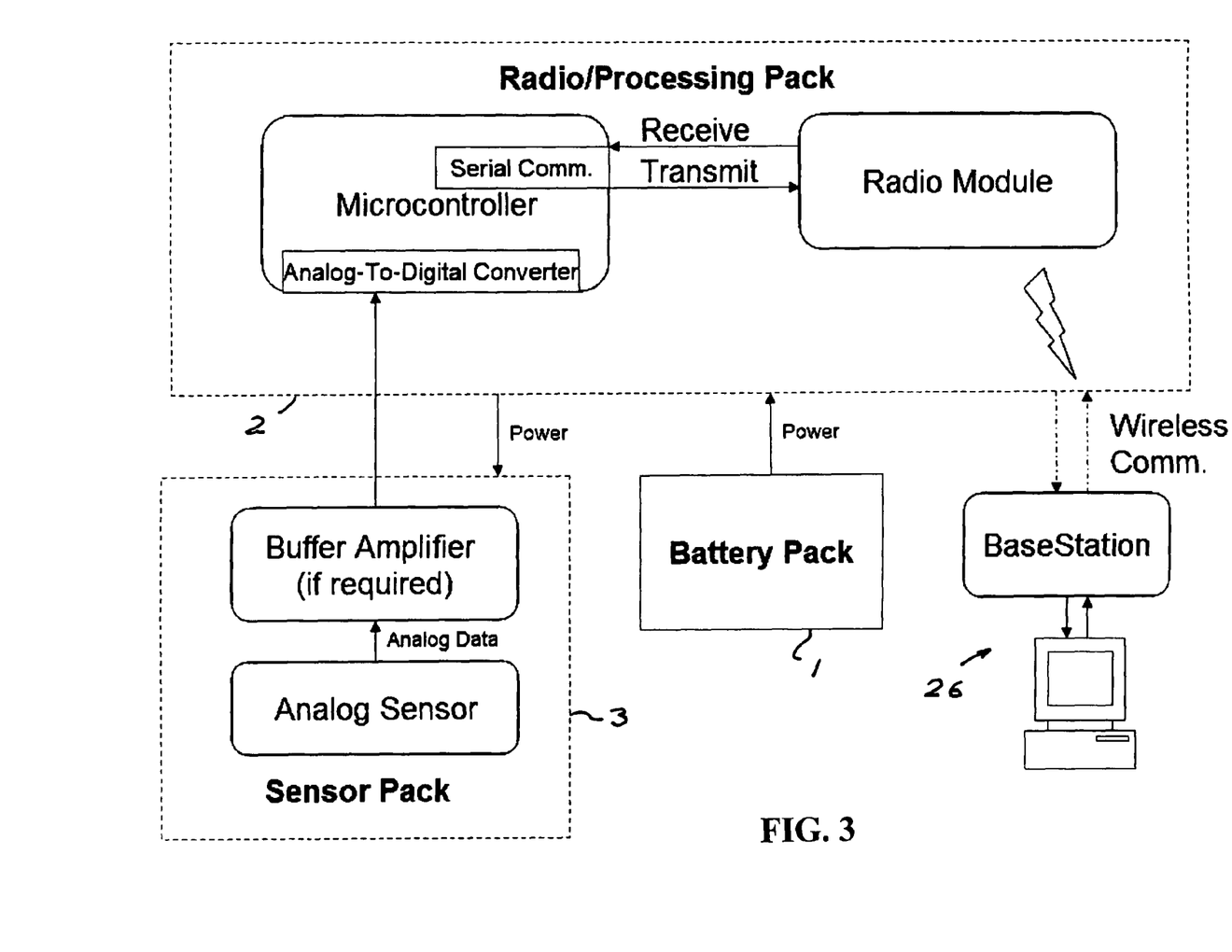
FIG. 3 is a block diagram of a preferred embodiment of the present invention showing the three modules of a preferred modular sensor unit in radio communication with a preferred base station.

The preferred circuit diagram for the processor-communication module is shown in FIG. 1. Microprocessor Part No.: PIC18F2520 is shown at 8 in FIG. 1 A small integrated circuit (Delta Model DFBM-CF220) Bluetooth transceiver 9 provides communication for the wireless sensor unit with a Bluetooth base station 26 as shown in FIG. 3. Battery connections are shown as BATT+ and a ten socket connector 10 providing electronic connection and power to the accelerometer sensor unit. The Delta Bluetooth transceiver is wired directly to a Universal Synchronous/Asynchronous Transmitter/Receiver (USART) transmit/receive line of the microprocessor 8. Both devices have a USART interface. When the computer Base Station transmits data, the chip antenna (ANT-2.45-CHP-x, made by Linx Technologies) receives the data and passes it on to the Bluetooth module, which has been pre-programmed to immediately route this data through its USART transmit line. The microcontroller then receives it on its receive line. When the microcontroller is transmitting data, it sends it on its transmit line, which is connected to the receive line of the Bluetooth module. The Bluetooth module then immediately sends this data through its antenna to the Base Station.

Mechanical switch 11 on the circuit diagram (SW1) can wake up the whole system from sleep, and when pressed again will put it back into sleep. LED flashing patterns have been programmed for both modes.

Sensor Module Circuit Diagrams

Figure 2:
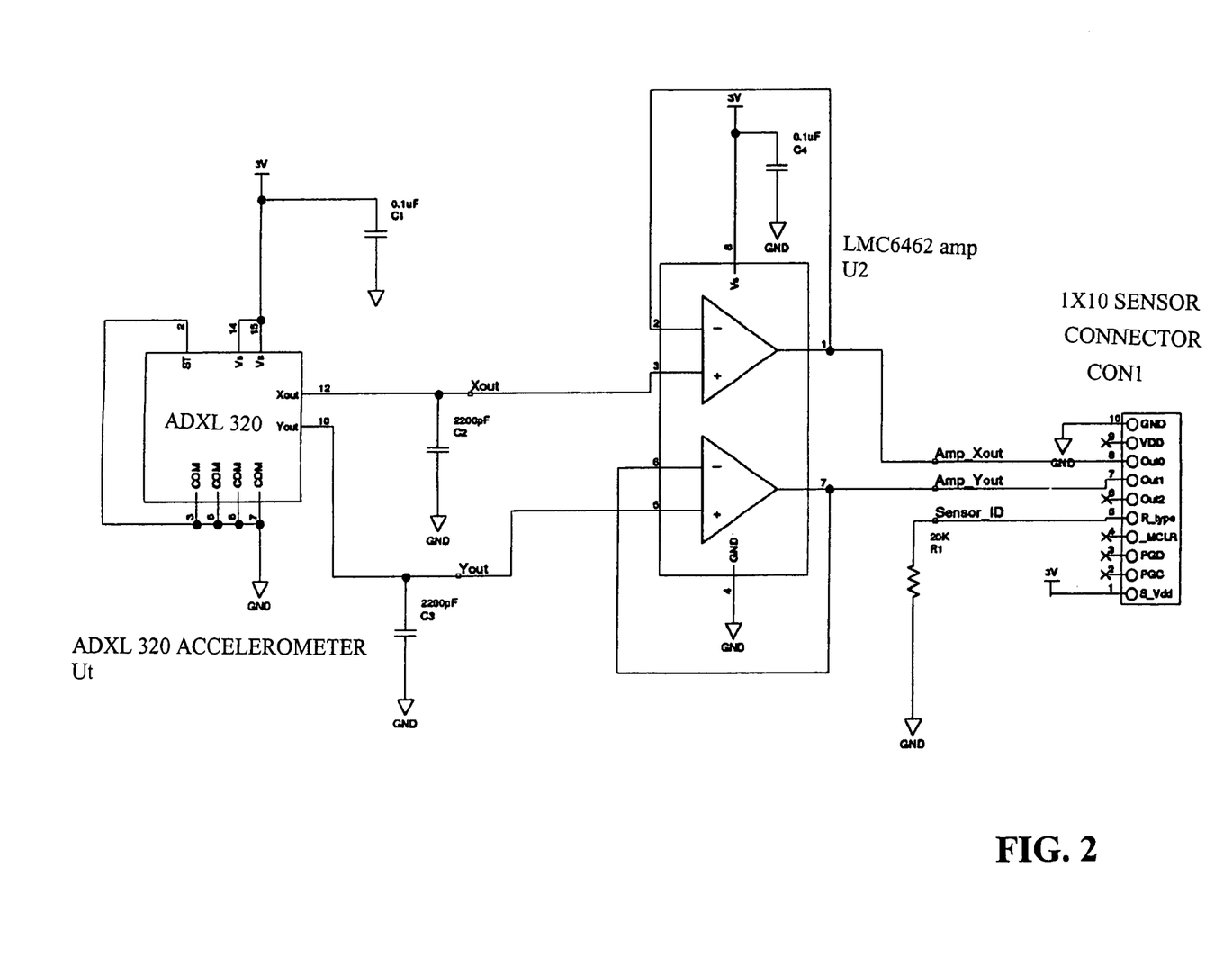
FIG. 2 is a circuit drawing showing the important components of an accelerometer sensor in the sensor unit portion of a preferred embodiment of the present invention.

A preferred circuit diagram for the accelerometer module is shown in FIG. 2. The ADXL320 accelerometer chip available from Analog Devices is shown at 12 in FIG. 2. As explained above it senses acceleration in two axes and analog output signals representing acceleration in these two axes is indicated at 14 and 16 in FIG. 2. These signals are amplified by amplifier circuits 18 and 20 utilizing LMC6462 amp U2 amplifier chips. The amplified signals are outputted through a ten socket connector 22 that mates with connector 10 in the processor-communication unit.

Battery Pack Module

Figures 3A, 3B, 3C, 3D, 3E:
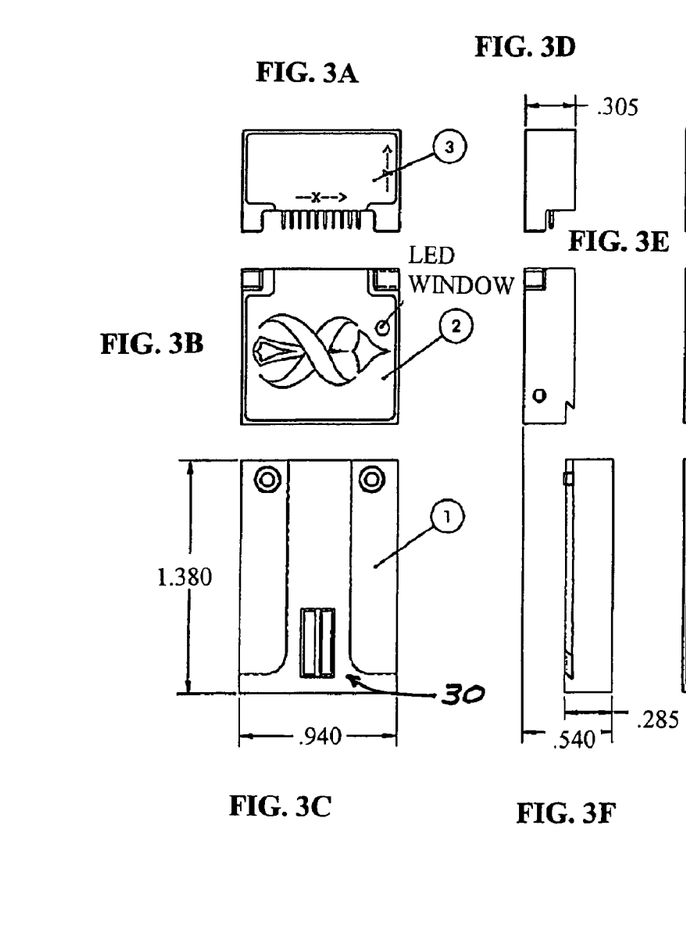
FIGS. 3A through 3O show views of a preferred three module modular sensor unit.

The battery pack module consists of the above mentioned battery 042025 from TCL Hyperpower Batteries, which Applicants have physically wired to a 2-contact flat connector. This flat connector can be seen at 30 in FIG. 3C, bottom center. The connector mates to a spring-loaded connector soldered to the printed circuit board in the processor-communication module.

Combining the Modules

Figures 3G, 3H, 3I, 3J, 3K, 3L, 3M, 3N, 3O:
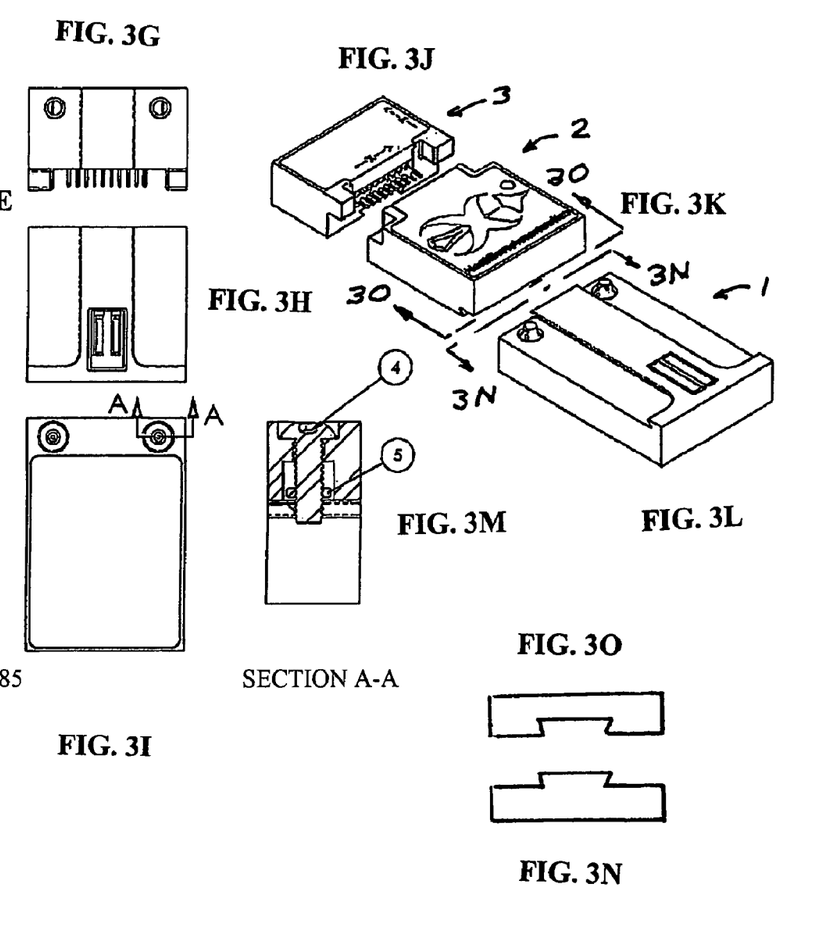

The wireless modular sensor unit consists of three interlocking components: the sensor component, the battery pack, and the radio/processing pack. The hardware casing is built around the printed circuit boards of the sensor module and the processor-communication module and battery pack module. The sensor module 3 and processor/radio packs 2 connect to each other via 10-pin socket connectors 22 and 10 (the male connectors being in module 3 and the female connectors being in module 2 as shown in FIG. 3G and 3H. These two interconnected packs can then slide into the battery pack module 1 via a "sliding dovetail" connection, the dovetail portion being shown in FIG. 3C with an expanded view in FIG. 3N as a part of module 1. The socket portion is at the bottom of modules 2 and 3 and is shown with an expanded view in FIG. 3O. Preferably the socket is slightly enlarged at the opening end in module 2 gradually becoming tighter toward the end of the socket in module 1 to make insertion easy and a tight fit once the unit is in its final box shape. When the three modules are slipped together the result is a very tight 1.380 inch×0.940 inch×0.540 inch box. The total volume of the unit is only about 0.7 cubic inches. Embodiments with a larger battery could have an increased volume; however, Applicants expect that all of their preferred embodiments should have total volumes of less than 1.0 to 2.0 cubic inches. The battery module can be easily disassembled from modules 1 and 2 by pushing on the joining sides of module 1 and the joining side of module 2. The module 1 and 2 can be disconnected by pulling them apart. Assembly is in reverse.

Base Station

Applicants achieve a high data rate by using the Bluetooth protocol. In this embodiment commercial Bluetooth modules Delta DFBM-CF220 shown at 24 in FIG. 1, wirelessly connects to a Base Station 26, which as stated above is another Bluetooth-enabled device that logs data to a computer. The Bluetooth Class 2 protocol has a maximum data rate of close to 2 megabits per second, in contrast with other commercially available low-power radio protocols which tend to be under 100 kilobits per second. Our current real-time maximum sampling rate is of 10 KHz, although more is theoretically possible. We sample the sensor at 10 KHz and transmit this data to a computer for logging. It is possible to sample up to 12 sensors with one Bluetooth Base Station, although if all 12 are transmitting simultaneously, the maximum data rate of 10 KHz is not guaranteed.

Ten-Bit Byte Packing and Data Compression

Bit Compression

For the purpose of this discussion, a 'count' is an analog-to-digital converter (ADC) value. For example, an 8-bit ADC would give 256 different values, or 'counts'. To improve the data throughput of the wireless sensors, Applicants use a data compression technique in particular. It is delta compression, which is a technique based on the differences between consecutive samples. Due to high data rates, successive samples will typically all have relatively close values. Since the sampling data is at 10-bit accuracy, samples range from 0 to $2^{10}-1$, or from 0 to $10^{23}$ 'counts'. A value that Applicants have found makes a good threshold is 16. That is, consecutive samples that are less than 16 'counts' apart can be encoded just by the difference in value. Therefore, for these consecutive samples, only 4 bits would be required to encode each sample, instead of 10.

The structure of a data packet can be described as follows: Each data packet has a header, the number of 'chunks' in that packet, and a tailer used for error detection. The 'chunk' can be described as follows. It consists of two parts: a 2-bit code encoding one of three possible states, and a variable-length code encoding the state:

State 1: The subsequent sample is expressed in its 10-bit entirety, as this is either the beginning of a new packet, or this sample is more than 16 counts away from the previous sample. The chunk then is 12 bits long in this case (2 bits for code and 10 bits for the sample)

State 2: The subsequent sample is between 0 and 15 counts higher than the previous sample. The chunk is then 6 bits long in this case (2 bits for code and 4 bits for sample)

State 3: The subsequent sample is between 1 and 15 counts lower than the previous sample. The chunk is then 6 bits long in this case (2 bits for code and 4 bits for sample).

Note that in many cases, states 2 and 3 will be by far the most common, and thus the average number of bits required to transfer a sample will go from 10 to what we found is an average of about 7 in several operational environments.

All these chunks are packed together with microcontroller code into a packet that can vary in size, and transmitted to the Base Station. The computer that receives the packets can then decompress the packet and either plot it in real time or log it to a file.

Byte Packing

Another technique used by Applicants is '10-bit byte packing'. This technique is easier to implement on the microcontroller, as it is not as computationally intensive as the previously described delta compression technique. This frees up processor cycles to perform other functions such as sensor detection, battery sampling, etc., as well as allows Applicants to run the microcontroller at a lower clock rate (and thus slightly lower power consumption). 10-bit byte packing is used to encode four 10-bit samples into 5 bytes. On the microcontroller, the lower 8 bits of the first four samples are put into 4 bytes, and the upper 2 bits of each of the four samples are put on the fifth byte. This is repeated in increments of 4 samples, and thus the data portion of each packet must be of a fixed length that is a multiple of 5. Applicants currently use 60 data bytes per packet, corresponding to 48 10-bit samples. Since this technique is also faster to process on the Base Station side, this allows Applicants to be able to use processor power to perform additional real-time techniques such as visualization of data from multiple sensors.

Dual Radio Functionality

Applicants use dual radio functionality. The main radio is the Bluetooth radio described (Bluetooth chip). The second radio in the processor-communication module is a much lower-power, low data rate, small receiver radio. We propose to use the Texas Instrument CC1110 as the low power radio.

Remote Wake-Up Sleep

The small, low-power radio will be "awoken" at periodic intervals by a timer running on a microcontroller in 'sleep' mode. The radio only has to remain awake for a few milliseconds. If it detects a wake-up signal, it will trigger an interrupt on the microcontroller to awaken the whole system. The wake-up signal can be sent from a powered Base Station, and it can be sent continuously so that the small radio can detect it. Preferably a latency period of no more than a minute is used in this embodiment between sending a wake-up signal and readiness of the wireless modular unit, which will be a good balance between power consumption and usability.

Hot-Swappability

This preferred embodiment provides software that recognizes when a sensor 3 is disconnected from the processor communication module 2 and another sensor is connected; the speck software will automatically detect this and send a signal to the Base Station. The Base Station can then update the plot in real-time and change axes depending on the type of sensor. This is referred to as "hot-swappability. The unit's software samples the "sensor identification" pin on the 10-pin connector, which is connected to a resistor to ground. This resistor will be different for every type of sensor that is connected to our device. On the processor side, the pin is connected to a fixed resistor to power, thus forming a voltage divider. The analog to digital converter samples this pin every second, and if it notices a change in resistance, it knows that a new sensor has been connected. It then sends a signal to the base station telling it that a new sensor has been connected, and the base station will listen for this and display the results in real time.

Sensor Identification and Interrogation

The signal sent from sensor 3 as explained above is detected by a simple voltage divider circuit. One of the analog-to-digital converter channels, the "sensor identification channel" on the microcontroller is wired with a resistor to power. The same channel is connected to a pin on the sensor printed circuit board that is connected with another resistor to ground. Both resistor values are fairly large to minimize power consumption.

If the sensor printed circuit board is not connected to the processor-communication radio PCB, the sensor identification channel will read the maximum number of counts (1023). This value can be set to equal no connected sensor. The values in between 0 and 1023 can then be any different type of sensor, depending on what the resistor value is on the sensor printed circuit board.

In order to ensure accuracy, Applicants provide tolerances in specifying the values. So for example, the value for the two-axis accelerometer from Analog Devices doesn't have to be exactly 512, but 512+/−32. This is to account for fluctuations and noise, and still leaves us with 16 possible sensor codes.

Software Calibration

Most sensors do not have automatic calibration, and thus software calibration has been implemented by Applicants. If the user wishes to calibrate the sensor, the base station software will ask the user to place the wireless modular unit in a number of different configurations and click a button for each configuration. For accelerometers, for example, this will result in a +1 and −1 g set of values for each axis. For a pressure sensor the user can be asked to provide a fixed pressure from the user's lab.

Plug-and-Play Functionality

The base station software has "plug-and-play" functionality. It works as follows:

Applicants in preferred embodiments ship custom-made Bluetooth Base Station that connect to a USB port on a computer, in conjunction with a CD-ROM containing the software. The software installation process should be as simple as possible.

Once the software is installed, the user can open the Base Station program, which is a program that consists of a set of command buttons such as sensor detection, battery voltage detection for each sensor, and an appropriate plot showing the desired measurements. A version of this display software is shown in FIG. 7

Once the user opens the Base Station program, the user presses the button on each of the sensor units he would like to use. The user then clicks a button on the Base Station program. The Base Station program will then show that each particular unit is active (after a short delay, depending on whether the module is sleeping, and to account for Bluetooth internal connection times), and what its status is (battery voltage, sensor connections). The user can then send commands to any combinations of the available, active "specks" to start sampling, logging, etc. This "plug-and-play" functionality differs sharply from commercially available Bluetooth pairing software, which requires users to manually establish a connection to each desired speck, type in PIN codes, and select from cryptically numbered "serial ports".

Variations

A single preferred embodiment of the present invention for use specifically with an accelerometer has been described in detail above. An important feature of this invention is that the modular sensor unit can support many different sensor modules and a single base station can support many wireless sensors each sensor being of the same type or of different types. Some of these variations are described briefly below:

Other Types of Wireless Sensors

Wireless sensors other than the accelerometer sensor are briefly described or listed below:
Acoustic Sensor A preferred acoustic sensor is similar to the accelerometer sensor described in detail except the integrated circuit chip is a Model LMV1012 chip available from National Semiconductor, connected to any standard electret microphone. With this chip utilized in the sensor module, a driving personal computer operating through a base station can awaken the sensor at any time and direct it to transmit detected sounds to the driving computer. The wireless sensor functions basically as a "bug". Parents can use it to periodically check on their babies in separate rooms.
Periodic Photographs This wireless sensor includes a tiny camera similar to a cell phone camera. It can be controlled as in the acoustic sensor described above to take and transmit images to the driving computer. The computer and the sensor can also be programmed so that the sensor transmits images of a field of view at regular intervals, such as 10 minute intervals, one hour intervals, one day or one week intervals. This sensor could be used as a part of an inexpensive surveillance system. It could also be used in experiments to produce a movie of plants growing. A preferred chip for this device replacing the accelerometer shown in FIG. 1 is Model No. SOCS056 available from Texas Instruments with offices in Dallas, Tex. In a preferred embodiment the sensor includes a lens unit focused at infinity. One to three additional low cost stick-on lenses could be provided to provide closer focus. In the design of this sensor module consideration must be give to the bandwidth of the network. For networks such a Bluetooth and Zigbee low pixel count sensors may be preferable.

Video with Sound

Video with sound will be difficult to accomplish with networks such as Bluetooth and Zigbee because of the limited bandwidth but would be feasible with Wi-Fi. These sensors also would drain the 150 milliamp hour battery very quickly. However, even with Bluetooth and Zigbee short video segments can be recorded, saved in the memory unit of processor communications module and then transmitted at low bit rates permitted by these networks. And the battery lifetime can easily be solved with a larger capacity battery which may mean a larger sized battery module and/or a wall power charger for the battery module.

Other Sensors

Figure 4:
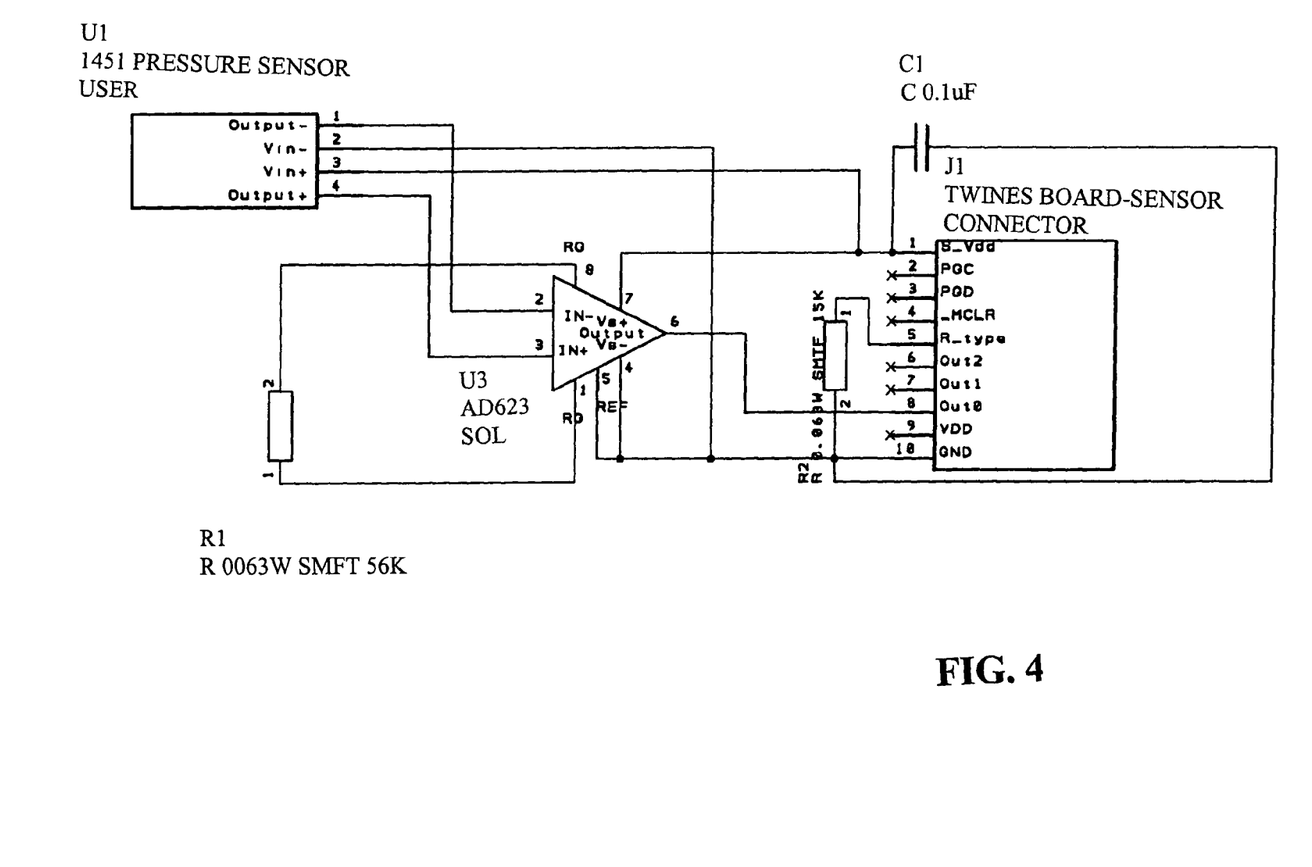
FIGS. 4, 5 and 6 are circuit diagrams respectively of a pressure sensor, a temperature sensor and a strain gage sensor.
Figure 5:
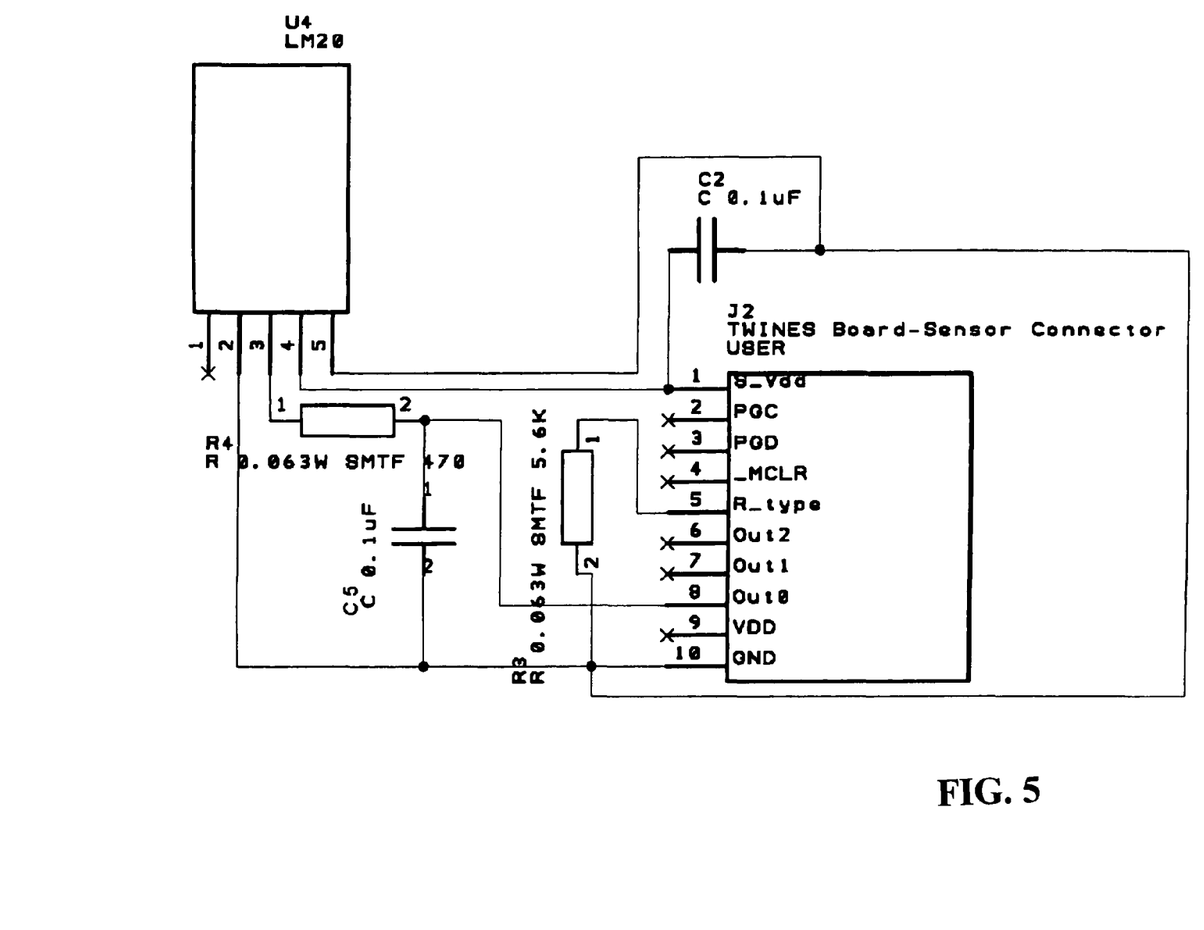
Figure 6:
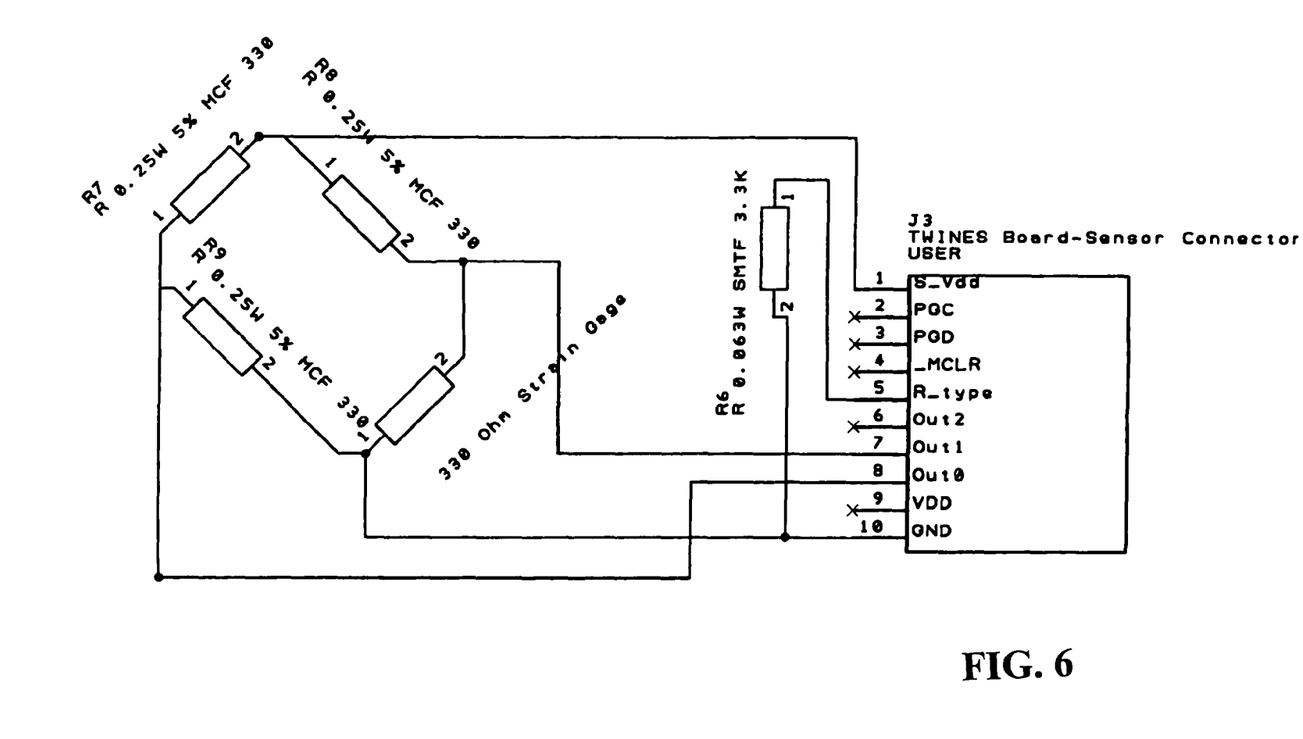

Integrated circuit chips are available to equip the sensor module of the present invention to function as a sensor for almost any type of sensing imaginable including all of those functions discusses in the Background section. Applicants have identified a preferred temperature sensor which is Model LM20 available from National Semiconductor with offices in Santa Clara, Calif. A preferred pressure sensor is a Model 1451 Series pressure sensor available for Measurement Specialties, Inc with offices in Hampton Va. A preferred strain gage sensor is the Vishay Strain Gage available from Vishay with offices in Malvern, Pa. Circuit diagrams for these three sensors are shown in FIGS. 4, 5 and 6 respectively.

Variations in the Battery Module

In the description of the first preferred embodiment a 150 milliamp-hour battery was specified. This battery will be adequate for many purposes but for many purposes this amount of energy will be insufficient. The solutions are battery modules with larger capacity which can be much greater than 150 milliamp-hours. Larger capacity batteries will at some point require larger battery modules. Another approach is to provide a recharging unit with an appropriate AC/DC converter that can be connected to a wall power source if one is available.

A preferred battery pack modified for wall power charging requires the following modifications. Applicants propose a slightly thicker pack, containing a battery, a printed circuit board with a Lithium Polymer Battery Charging chip, and a standard jack for a wall-powered transformer. Applicants prefer the BQ2000 chip, made by Texas Instruments, for charging the Lithium Polymer battery in the battery pack. Also there are commercially available wall transformers that output the necessary 4 volts to power this chip, and the chip can be configured to constantly trickle charge the battery. Once power is disconnected, the battery can continue on powering the system. This configuration will allow the device to operate for long periods of time with only one power connection to the wall. Also, the unit could be kept charged with a solar charging system.

Marketing the Modular Wireless Sensor Unit

Applicants intend to at least initially market the present invention on the Internet. A preferred approach is to offer:
1) a base station that can be attached to any modem personal connected to the Internet,
2) one battery charger,
3) a compact disk with software for programming the personal computer,
4) five processor-communications modules,
5) two battery pack modules with replaceable batteries,
6) three battery pack modules modified for wall power charging along with three wall power chargers,
7) a basic set of 15 sensors modules including:
   a) two acoustic sensor modules,
   b) two periodic photograph sensor module
   c) two voltage sensor modules,
   d) two current sensor modules,
   e) two temperature sensor modules,
   f) two pressure sensor modules, and
   g) one strain gage sensor module.
Additional sensor units will be available.

Other Variations

The present invention has been described in terms of specific preferred embodiments; however, there are many modifications, substitutions and additions that can be made without deviating form the scope of the invention. For example moving up to Wi-Fi or even WiMax for very greatly increasing the amount of information that could be transmitted in real time would provide some obvious advantages. The present invention can be applied in a great number of situations. These include research laboratories, hospitals and clinics, school laboratories, housing, security, and the automotive industry. For example, in the automotive industry, the accelerometers could be used for airbag deployment and the pressure sensors for tire pressure checking. In the housing and security industries, the sensors could be programmed to detect motion or intrusion, and automatically control lighting or emergency alarm systems. In the medical industry, the sensors could replace wiring used in vital sign monitoring and other technologies such as EKG data collection and transmission.

We claim:

1. A miniature modular wireless sensor unit comprising:
A) a processor-communications module comprising a processor and a radio transceiver,
B) a battery pack module comprising a battery, and
C) a swappable sensor module comprising a sensor;
said processor-communications module, said battery pack module and said swappable sensor module interlocked together via a sliding dovetail connection into a compact wireless sensor unit and being adapted for easy assembly and disassembly with finger force,
wherein said sensor is a component in a wireless sensor network comprising a base station and a plurality of other sensors including a plurality of types of sensors, each type of sensor comprising a sensor identification pin connected to a resistor to ground wherein the resistor of each type of sensor has a unique resistance different from the resistance of the other types of sensors so that software in the base station can identify each type of sensor providing for hot swappability of the sensors.

2. The miniature modular wireless sensor unit of claim 1 wherein said sensor unit occupies a volume of less than about 2.0 cubic inches.

3. The miniature modular wireless sensor unit of claim 1 wherein said sensor unit occupies a volume of less than about 1.0 cubic inch.

4. The miniature modular wireless sensor unit of claim 1 wherein said sensor unit occupies a volume of about 0.7 cubic inches or less.

5. The miniature modular wireless sensor unit of claim 1 wherein said sensor unit is adapted to fit together with a sliding dovetail joint.

6. The miniature modular wireless sensor unit of claim 5 wherein said sliding dovetail joint is tapered for ease of assembly and tight fit.

7. The miniature modular wireless sensor unit of claim 5 wherein the battery module comprises a dovetail element and the processor-communications module and the sensor module each comprises a dovetail socket.

8. The miniature modular wireless sensor unit of claim 1 wherein said radio operates at a frequency range of about 2.4 MHz.

9. The miniature modular wireless sensor unit of claim 1 wherein said radio is adapted to function as a part of a Bluetooth network.

10. The miniature modular wireless sensor unit of claim 1 wherein said radio is adapted to operate as a part of a Zigbee network.

11. The miniature modular wireless sensor unit of claim 1 wherein said radio is adapted to operate as a part of a Wi-Fi network.

12. The miniature modular wireless sensor unit of claim 1 said sensor is a type of sensor chosen from the following group of sensors:
- A) thermal sensor,
- B) pressure sensor,
- C) optical image sensor,
- D) motion sensor,
- E) acc elerometer sensor,
- F) strain gage sensor,
- G) flow sensor,
- H) voltage sensor,
- I) electric current sensor,
- J) motion sensor,
- K) acoustic sensor,
- L) chemical sensor,
- M) radiation sensor,
- N) other type of thermal sensor,
- O) other type of optical sensor,
- P) other type of electromagnetic sensor and
- Q) other type of mechanical sensor.

13. The miniature modular wireless sensor unit of claim 1 wherein said sensor unit is along with other sensor units is deployed in communication with a single base station.

14. The miniature modular wireless sensor unit of claim 13 wherein the single base station is a Bluetooth base station.

15. The miniature modular wireless sensor unit of claim 1 wherein said processor comprises software adapted to provide byte packing.

16. The miniature modular wireless sensor unit of claim 1 wherein said processor comprises software adapted to provide data compression.

17. The miniature modular wireless sensor unit of claim 1 wherein said processor comprises software adapted to provide a sleep mode with periodic wakeups to check for wakeup signals.

18. The miniature modular wireless sensor unit of claim 1 wherein said battery module is adapted for recharging from wall power.

19. The miniature modular wireless sensor unit of claim 1 wherein said battery module comprises a replaceable rechargeable battery.

20. The miniature modular wireless sensor unit of claim 1 and further comprising a second lower power, low data rate small receiver radio adapted to be awoken at periodic intervals to listen for a wake-up signal to awaken the sensor.

* * * * *